United States Patent
Dippenaar

(10) Patent No.: US 9,887,889 B1
(45) Date of Patent: Feb. 6, 2018

(54) STATE RECONCILIATION USING EVENT TRACKING AND POLLING

(71) Applicant: Amazon Technologies, Inc., Reno, NV (US)

(72) Inventor: Andries Dippenaar, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 966 days.

(21) Appl. No.: 13/942,630

(22) Filed: Jul. 15, 2013

(51) Int. Cl.
*H04L 12/26* (2006.01)

(52) U.S. Cl.
CPC .................................... *H04L 43/04* (2013.01)

(58) Field of Classification Search
None
See application file for complete search history.

(56) References Cited

U.S. PATENT DOCUMENTS

| | | | |
|---|---|---|---|
| 7,937,616 B2 | 5/2011 | Armstrong et al. | |
| 8,006,124 B2 | 8/2011 | Park et al. | |
| 8,108,733 B2 | 1/2012 | Richmond | |
| 8,380,845 B2 | 2/2013 | Mercuri | |
| 9,002,997 B2* | 4/2015 | Kowalski | H04L 41/0803 709/224 |
| 2002/0188711 A1* | 12/2002 | Meyer | G06F 3/0605 709/223 |
| 2006/0179059 A1 | 8/2006 | Reed et al. | |
| 2009/0287720 A1 | 11/2009 | Herter et al. | |
| 2011/0167469 A1 | 7/2011 | Letca et al. | |
| 2012/0297059 A1 | 11/2012 | Bross | |
| 2013/0007268 A1 | 1/2013 | Breiter et al. | |
| 2013/0054780 A1 | 2/2013 | Bade et al. | |
| 2013/0097304 A1* | 4/2013 | Asthana | H04L 41/5025 709/224 |
| 2014/0214915 A1* | 7/2014 | Dragon | H04L 43/04 709/201 |

OTHER PUBLICATIONS

U.S. Appl. No. 13/528,271, filed Oct. 22, 2012, Long X. Nguyen.
U.S. Appl. No. 15/608,478, filed May 30, 2017, Vineet Shashikant Chaoji et al.

\* cited by examiner

*Primary Examiner* — Jeffrey R Swearingen
(74) *Attorney, Agent, or Firm* — Robert C. Kowert; Meyertons, Hood, Kivlin, Kowert & Goetzel, P.C.

(57) ABSTRACT

Methods and apparatus for state reconciliation using event tracking and polling are disclosed. Occurrences of events that may result in a state change of an entity of a provider network are monitored. An indication of an expected state of the entity is transmitted to a reconciler. The reconciler determines whether a discrepancy exists between the expected state and a detected state, obtained using a polling mechanism, of the entity. In response to determining that a discrepancy exists, one or more actions are initiated.

20 Claims, 8 Drawing Sheets

STATE RECONCILIATION USING EVENT TRACKING AND POLLING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As the functionality and features supported by providers of virtualized compute, storage and networking resources grows, and as the fleet of hardware platforms that are used by large-scale providers grows, the task of implementing administrative control operations such as monitoring the status of the platforms (and/or the status of virtualized resources and applications executing on the platforms) has become more complicated. In environments in which clients of the virtualized services are able to initiate at least some types of state changes from outside the provider's network, e.g., using application programming interface (API) calls exposed by the services, there is also an increased likelihood of malicious agents attempting to manipulate resources of the network.

Figure 1:
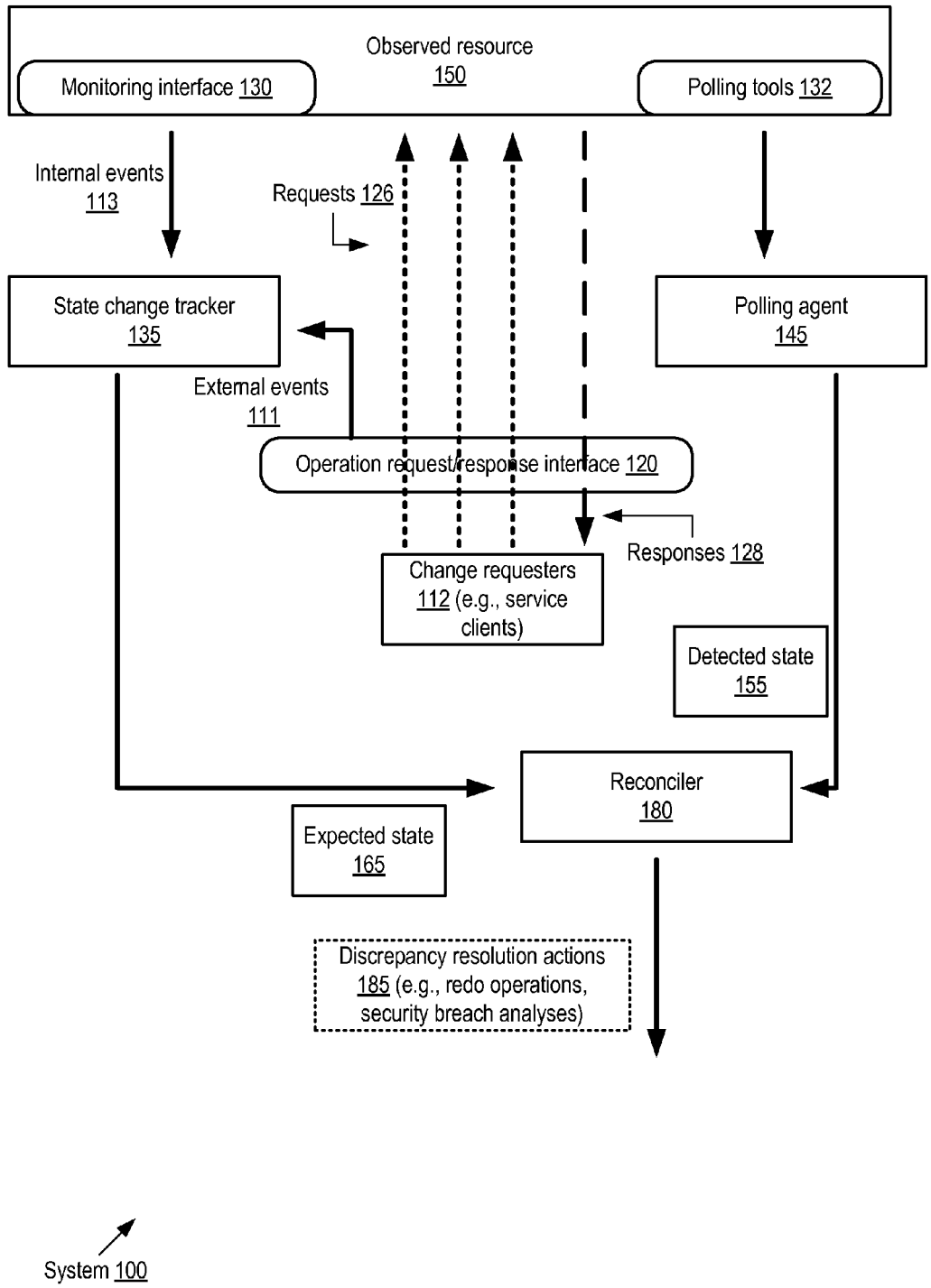
FIG. 1 illustrates an overview of a system for reconciling state information obtained via a plurality of independent paths from a resource, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for state reconciliation of provider network resources using event tracking and polling are described. Networks set up by an entity such as a company or a public sector organization to provide one or more network-accessible services (such as various types of cloud-based storage, computing or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

Various types of events, such as client-requested operations or service-generated administrative actions may, lead to state changes at the resources of a provider network. In some embodiments, programmatic interfaces such as one or more application programming interfaces (APIs), web-based consoles, other types of web pages, command-line tools, or graphical user interfaces may be implemented by various provider network services, enabling clients to submit requests directed to the resources that are allocated to them. At least some of the requests received via such interfaces, such as requests to launch or stop virtual compute servers, may result in state changes, e.g., when operations corresponding to the requested command eventually complete. Acknowledgements of the completion of requested operations may be sent to the requesters, at least for some types of requests. Such acknowledgements may in some cases be asynchronous or delayed with respect to the timing of the requests, while in other cases the responses to the requests may be immediate or synchronous. Similar programmatic interfaces may also be used for control operations by administrative components of the services themselves. In at least some embodiments, one approach to tracking resource state may be to monitor these types of state-changing events, including both the requests and the responses/acknowledgements corresponding to the requests.

According to some embodiments, modules or components of the services called state change trackers may be configured to monitor the occurrences of such state-changing events. For example, as described below, in some embodiments state change trackers may generate or obtain records of various types of API calls directed at provider network resources, as well as records of responses or results of the API calls. In some embodiments, various services of the provider network may include a respective API handler layer that receives API calls, and transmits the calls (or internal representations of the calls) on to the service resources where the appropriate operations are actually performed. The API handler layer may also receive responses from the service resources, indicating the results of the requests. In some such embodiments, a state change tracker responsible for monitoring API-related state changes may be implemented as part of the API handler layer, or as an entity that communicates with the API handler layer. At least some types of state changes may result from other types of events, i.e., events not directly correlated with API invocations in some embodiments (e.g., there may be hardware or software failures at the service resources), and in such embodiments some state change trackers may be configured to monitor such non-API related events as well (e.g., by reading, or obtaining notifications related to, various logs or alerts associated with the resources).

Using a state change tracker's records of potential and actual state-changing events, it may be possible, at least in principle, to generate a representation of an expected state of a given resource. For example, if a network-accessible resource R1 of a provider network service starts out in an initial state S1 (in accordance with some state definition applicable to R1) at time T1, and a complete ordered list of the events that could potentially affect the state of R1 during a time period from T1 to T2 is obtained by a state change tracker or trackers, such a list may be used to predict an expected state S2 for R1, as of time T2.

A number of factors may influence the efficiency and accuracy with which expected states can be predicted in different embodiments. For example, depending on the granularity at which resource state changes are defined and the number of resources whose states are to be monitored, the volume of state change information that has to be tracked during a given time period may become quite large in at least some embodiments, which may result in a requirement for substantial amounts of storage, computation, and/or network bandwidth. In addition, given the generally network-focused architecture of the services, it may be the case that one or more records associated with some types of state-changing events are lost during network transfers, e.g., due to overload conditions, either at the state change trackers or along a network path used for tracking the events. Generating a representation of an expected state for a resource that can be affected by asynchronous events such as API requests whose results only become apparent after a delay may also be complicated, as records of the asynchronous results may have to be matched with corresponding requests. Attempts by malicious entities to manipulate resource states for illegitimate purposes, e.g., by "spoofing" or issuing unauthorized API calls, may also complicate the state change trackers' efforts.

Accordingly, in some embodiments an approach to resource state management that relies not just on change state trackers, but also on an independent source of state information, may be implemented. In such embodiments, a polling agent or poller may be configured to periodically (or according to some schedule) detect the state of a given resource, e.g., using tools that are typically not utilized by the state change trackers. The view of the resource state that is obtained by the polling agent (which may be referred to as the detected state of the resource) may then be reconciled with the expected state determined by the state change trackers, e.g., at a reconciler component of the state monitoring system. Thus, according to at least some embodiments, a reconciler may receive state information for a given resource from two types of sources: an indication of expected state from a state change tracker, and an indication of a detected state from a polling agent. The reconciler may determine whether a discrepancy exists between the detected state and the expected state. If a discrepancy is found, one or more corrective or responsive actions may be initiated in at least some embodiments. For example, a determination may be made regarding the severity of the discrepancy, and whether it is possible to resolve the discrepancy simply by re-issuing a state change request, or whether an investigation of a potential security breach is warranted. A request to re-implement a state change may accordingly be made, and/or a security breach investigation may be initiated.

By using such a reconciliation-based approach to state management, which relies on two alternative independent approaches to determining resource state, the probability of resolving anomalous states reasonably quickly, and of identifying potential security breaches reasonably quickly, may be significantly increased. In some embodiments, a representation of the expected state may be generated at the reconciler, e.g., using event records sent to the reconciler from the state change tracker, while in other embodiments the expected state may be determined at the state change tracker itself and then transmitted to the reconciler. Similarly, in some embodiments the data obtained from the polling mechanism may be provided to the reconciler and the determination of the detected state may be performed at the reconciler, while in other embodiments the polling agent may interpret the polling data and generate a representation of the detected state for transmission to the reconciler.

Various different types of state definitions, and corresponding state transition definitions, may be used in different embodiments. For example, each of the services of the provider network may define states for their respective sets of resources, or some number of the services may share state definitions. Hardware and/or software state changes at virtualization hosts may be managed using the reconciliation mechanism described above, as well as hardware and/or software state changes at the virtualized resources (such as virtual compute servers, storage servers, database servers and the like) instantiated at the virtualization hosts. In some embodiments, one or more programmatic interfaces may be implemented to enable clients to specify state definitions and/or state transition definitions for client applications, allowing clients of various services to make use of the reconciliation mechanism for managing the states of their respective applications. Thus, in such embodiments, the set of resources and states that the service may typically be aware of may be made extensible, allowing clients to make use of the state change trackers, polling agents and reconcilers.

In some embodiments, portions or all of the state change trackers, the polling agents, and/or the reconcilers may be implemented at the observed resources themselves. For example, in one embodiment in which a virtualization host's state is to be monitored, a software module that polls the state of the virtualization host may be installed as part of the virtualization management software stack at the host, or as part of an administrative operating system at the host. Locally-installed tools such as shell scripts that can query the administrative operating system and/or other operating systems installed on virtualized compute server instances at a virtualization host may be used for polling in some embodiments, e.g., either by local (on-host) polling agents or by external pooling agents instantiated at other computing devices of the provider network. In some embodiments, a state change tracker module or a reconciler module may be installed on a monitored resource. In at least some embodiments, redundant replicas of the various components of the reconciliation mechanism may be implemented—e.g., a plurality of state change tracker replicas may be established for monitoring events at a given resource, a plurality of polling agents may be set up for the given resource, or a plurality of reconcilers may be configured for the given resource. In some implementations utilizing replicas, a quorum-based approach may be used to determine the expected state, the detected state, and/or the results of the state discrepancy analysis. In some embodiments, the state change trackers, polling agents and/or reconcilers may each be implemented using a plurality of distributed modules or devices.

Example System Environments

FIG. 1 illustrates an overview of a system 100 for reconciling state information obtained via a plurality of independent paths from a resource, according to at least some embodiments. As shown, a state change tracker 135 may be configured to monitor events of various types that may result in state changes at an observed resource 150 (e.g., at a virtualization platform configured to host one or more virtualized compute servers, storage servers or the like). Operation requests 126 submitted via a request/response interface 120 by change requesters 112 (e.g., clients of various services implemented using the observed resource 150) may be tracked, for example, as indicated by external events arrow 111. Responses 128 to the submitted requests, indicting for example the success or failure of the requests, may also be monitored by the state change tracker 135. Some responses 128 may be synchronous or immediate with respect to the corresponding requests 126, while other responses may be asynchronous or delayed, and the state change tracker 135 may be configured to match responses with requests in at least some embodiments.

In addition to monitoring the external events 111, in the depicted embodiment the state change tracker 135 may also monitor internal events 113 at the observed resource 150, e.g., hardware and/or software events that need not necessarily be the result of externally-generated requests received via the interface 120. In some embodiments the observed resource may provide a monitoring interface 130 that can be used by the state change tracker 135, e.g., an automated notification interface for specified types of events, or an interface providing access to various logs and/or alerts that may be generated at the observed resource. Using the information it collects regarding the external and internal events, the state change tracker may provide an indication of an expected state 165 to a reconciler 180 in the depicted embodiment. The granularity of the expected state information, and/or the frequency or schedule at which the expected state information is provided to the reconciler 180 may vary in different embodiments. In some embodiments, for example, the state change tracker may simply provide a list (e.g., ordered by timestamp) of the events that it has monitored to the reconciler 180, and the reconciler may construct its own representations of the state of the observed resource 150. In other embodiments, the state change tracker may aggregate event records and produce its own representation of the expected state 165, in accordance with a state definition associated with the observed resource, and provide the representation to the reconciler. In some implementations, the state information (which may be quite voluminous to begin with) may be compressed or otherwise encoded before transmission to the reconciler. In one implementation, a differential or incremental indication of expected resource state may be provided—e.g., only changes to a previous version of the expected state may be supplied to the reconciler 180 by the state change tracker 135. In at least some embodiments, respective state change trackers may be implemented for monitoring external interactions (e.g., API call invocations) of the observed resource, and for monitoring internal events at the observed resource. Thus, the indication of expected state 165 may be the product of a collaboration between several different state change trackers in such embodiments.

One or more polling agents 145 may be configured to detect the state of the observed resource 150 using polling tools 132 at various points in time, e.g., in accordance with a pre-determined configurable schedule, or in response to requests from the reconciler 180, in the depicted embodiment. The one or more polling agents 145 may provide an indication of the detected state 155 to the reconciler. The reconciler may determine whether a discrepancy exists between the detected state 155 and the expected state 165. If a discrepancy is detected, one or more discrepancy resolution actions 185 may be initiated, e.g., security breach analysis may be performed, a repair to a damaged component may be requested, or one or more state-changing events may be re-issued.

The manner in which state information is collected by a state change tracker in the depicted embodiment may differ from the manner in which a polling agent collects its state information—e.g., the state change tracker may typically not be aware of, or not be provided access to, polling tools 132, and the polling agent may not be aware of, or provided access to records of, the external events 111 or the internal events 113. The timing or frequency with which the reconciler receives the indications of expected state and the indications of detected state may also not be correlated with each other. Thus, the state change tracker and the polling agent may represent independent sources or pathways of state information for the reconciler, thereby increasing the validity of the discrepancy analysis performed by the reconciler in the depicted embodiment. It is noted that at least in some embodiments, in the vast majority of cases, no discrepancy may be found between the expected and detected states, indicating that the observed resource is behaving as expected. Accordingly, the number of times that corrective actions have to be initiated as a result of the discrepancy analysis may typically be quite low.

Figure 2:
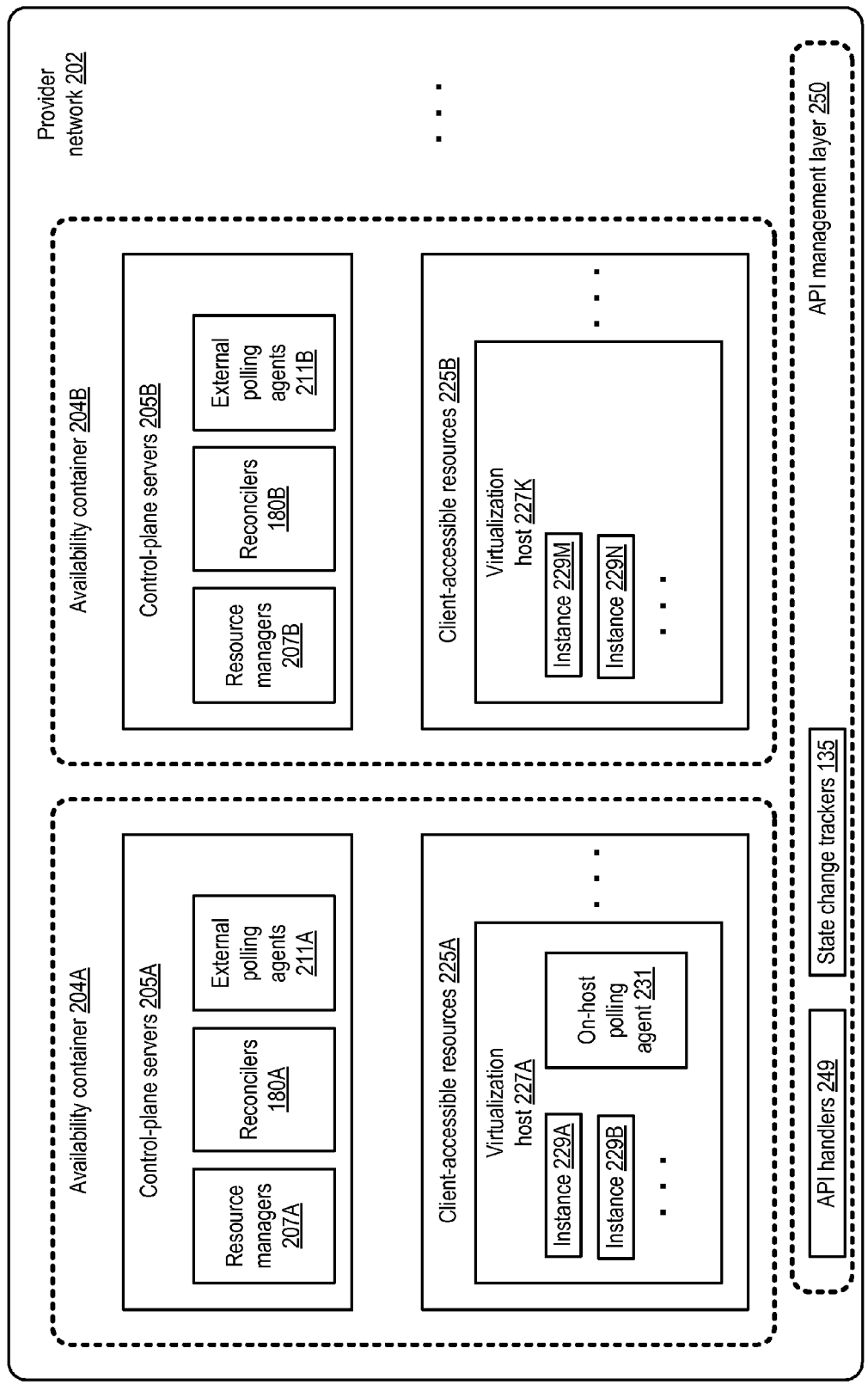
FIG. 2 illustrates an example of a provider network in which a state reconciliation mechanism is employed for virtualization hosts, according to at least some embodiments.

Reconciliation-based resource state management approaches similar to that illustrated in FIG. 1 may be utilized in a variety of environments. FIG. 2 illustrates an example of a provider network in which such a state reconciliation mechanism is employed for virtualization hosts, according to at least some embodiments. As shown, provider network 202 comprises resources organized into a plurality of availability containers 204, such as availability containers 204A and 204B. A given availability container 204 may comprise a portion or all of one or more data centers in the depicted embodiment, and may be engineered in such a way as to prevent various types of failures within a given availability container from impacting operations at other availability containers. Thus, for example, availability container 204A may comprise a set of hardware, software and infrastructure components (such as power supplies, power distribution units, cooling/heating equipment, networking equipment and the like) that has a failure profile (e.g., a probability distribution over time of various types of faults or errors) that is not expected to be correlated with the failure profile of a different availability container 204B. Each availability container may itself be designed to have very low failure rates, along with the isolation characteristics that prevent cascading faults across multiple availability containers. The implementation of numerous availability containers 204 capable of containing failures within their boundaries may thus help support highly reliable and durable services—e.g., in one implementation, N replicas of the same database table partition may be stored at each of N different availability containers so that the partition remains accessible even if N−1 availability containers happen to become unavailable at once, reducing the probability of a complete outage to very near zero. Availability containers may also be referred to as "availability zones" in some implementations. In at least some embodiments, the resources of a geographically distributed provider network 202 may be organized into a hierarchy of geographical regions, with each region comprising some number of availability containers, and each availability container comprising part or all of one or more data centers.

In the embodiment illustrated in FIG. 2, each availability container 204 may include two categories of resources: control plane resources used primarily for administrative purposes by the services implemented in the provider network, and client-accessible resources that may be assigned to or allocated to clients utilizing the services. Examples of control plane resources shown in FIG. 2 include resource managers (e.g., 207A and 207B), reconcilers (e.g., 209A and 209B), and external polling agents (e.g., 211A and 211B). Collectively, the control plane servers 205 (e.g., control plane servers 205A and 205B in availability containers 204A and 204B respectively) may be responsible for a variety of administrative functions, including for example detecting and resolving anomalous or unexpected states of client-accessible resources 225A and 225B.

As shown, client-accessible resources 225A in availability container 204A may include a plurality of virtualization hosts 227 of a network-accessible virtual computing service, such as host 227A, and client-accessible resources 225B in availability container 204B may include its own set of virtualization hosts, such as host 227K. A given virtualization host 227 may comprise a combination of hardware and software elements that can be used to instantiate various virtualized compute resources, such as virtual compute resource instances 229A and 229B at host 227A, and compute resource instances 229M and 229N at host 227K. Compute resource instances, each of which may for example include a virtual machine launched using a particular machine image at the request of a client of the virtual computing service, may be referred to simply as instances herein. In the embodiment shown in FIG. 2, at least some of the virtualization hosts 227 may include local or on-host polling agents, such as on-host polling agent 231 at virtualization host 227A. Other virtualization hosts, such as host 227B, may not include on-host polling agents.

Resource managers 207 may be responsible for a variety of operations in the depicted embodiment, such as initializing and/or allocating various instances 229 on behalf of clients, reserving instances for clients, authorization and authentication of client requests, and so on. Clients of the virtual computing service may interact with the resource managers 207 and/or with the instances 229 using a set of APIs. The API management layer 250 may include various resources (e.g., additional control plane servers) designated as API handlers 249, responsible for receiving API calls submitted by clients, as well as a plurality of state change trackers 135 configured to monitor the API calls and their results. The state change trackers 135 may collect records of API invocations over time. State change trackers 135 may submit either the records themselves, or representations of expected states of the virtualization hosts, the instances, and/or the applications running at the instances, derived from the records of API invocations, to the reconcilers 209. Polling agents, including some combination of external and internal polling agents, may be assigned the task of determining resource states at the various types of monitored resources using a different mechanism than monitoring API calls. A given polling agent may utilize tools installed at the virtualization hosts, such as shell scripts, operating system tools, and/or client application monitoring tools, to periodically (or based on triggering conditions) generate an indication of a detected state of a resource for a reconciler. A given reconciler 209 may determine whether, for each of asset of resources, a discrepancy exists between the expected state and the detected state. In the event that a discrepancy is found, responsive actions may be taken, such as generating an alert, initiating a security breach analysis, re-issuing a state-changing command, and so on.

In some embodiments, at least some state tracking and reconciliation operations may be performed across data center boundaries or availability container boundaries. For example, state changing events that occur at a given virtualization host of one availability container may be monitored via the state change trackers of the API management layer, but the polling agent and/or the reconciler used for that virtualization host may be located at a different availability container. In some embodiments, local reconcilers and/or polling agents (i.e., reconcilers or polling agents that are located within the same availability container 204 as the resources being monitored) may be used in preference to non-local reconcilers or polling agents.

State Change Tracking Based on API Invocation Records

Figure 3:
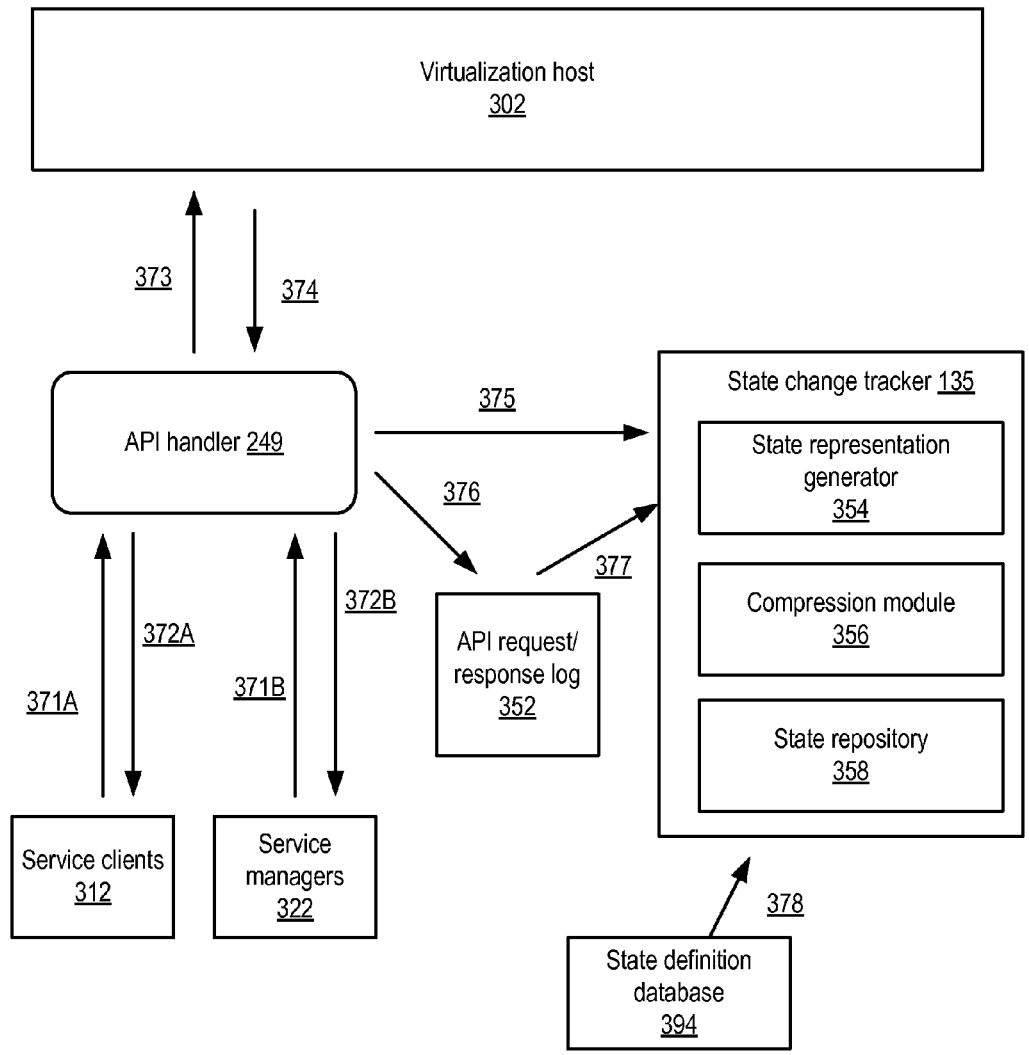
FIG. 3 illustrates a state change tracker configured to obtain information about application programming interface (API) invocations directed at a resource, according to at least some embodiments.

FIG. 3 illustrates a state change tracker configured to obtain information about application programming interface (API) invocations directed at a resource, according to at least some embodiments. Service clients 312, as well as service administrative components such as service managers 322 may invoke a variety of state-changing APIs via API handler 249 in the depicted embodiment (as indicated by arrows 371A and 371B). In some embodiments, for example, an API handler 249 may comprise a front-end server of the virtual computing service that implements virtualization host 302. In turn, the API handler 249 may submit corresponding internal representations of the API calls to the virtualization host 302, as indicated by arrow 373. Responses may be received at the API handler 249 from the virtualization host 302 after operations corresponding to the requests are performed, as indicated by arrow 364. In some embodiments, responses to the original API calls may be provided to the invokers of the APIs, as indicated by arrows 372A and 372B.

The API handler 249 may provide information about the invoked APIs and/or their results to state change tracker 135 either in real time (arrow 375), e.g., as the APIs are invoked and the results are obtained, or via an intermediary such as request/response log 352 (arrows 376 and 377). For example, the API handler may write records of API invocations and their results into log 352, and state change tracker 135 may read the logged records as needed, e.g., asynchronously with respect to when the records are written. In some embodiments both real-time notifications and buffered or intermediary-based notifications may be used—for example, the state change tracker may use the real-time notifications to the extent possible, but may have to use the logged information if the real-time event rate exceeds a threshold or if the state change tracker does not have enough free compute cycles to keep up with the real-time events.

Based at least in part on the API invocation and response information collected, the state change tracker 135 may generate a representation of an expected state of the virtualization host 302. For example, API records collected during a time interval of T minutes may be analyzed by state representation generator 354, and a state descriptor formatted according to JSON (JavaScript™ Object Notation) or XML (Extensible Markup Language) may be created for transmission to a reconciler. In some embodiments, in which for example a plurality of state representations are generated and/or the size of the representations is large, a compression module 356 may be used to reduce the amount of data that has to be transmitted to the reconciler over the network.

According to at least some embodiments, a state definition database 394 may be consulted by the state change tracker when generating state representations. The state definition database may, for example, describe the entries to be included in state representations for various resources including virtualization hosts 302, virtualized resources such as compute instances or storage instance, client applications, and the like, as well as the mappings between API invocations and state changes. In some embodiments, the state change tracker 135 may store representations of previously generated expected states, e.g., in a repository 358. In some such embodiments, for a given resource, instead of for example sending a full representation of a resource's expected state, the state change tracker may only send indications of the changes or deltas since the previous indication of expected state was sent to the reconciler. Such an approach may significantly reduce the volume of traffic between the state change tracker and the reconciler(s) to which it provided expected state information.

State Definition Interfaces

Figure 4:
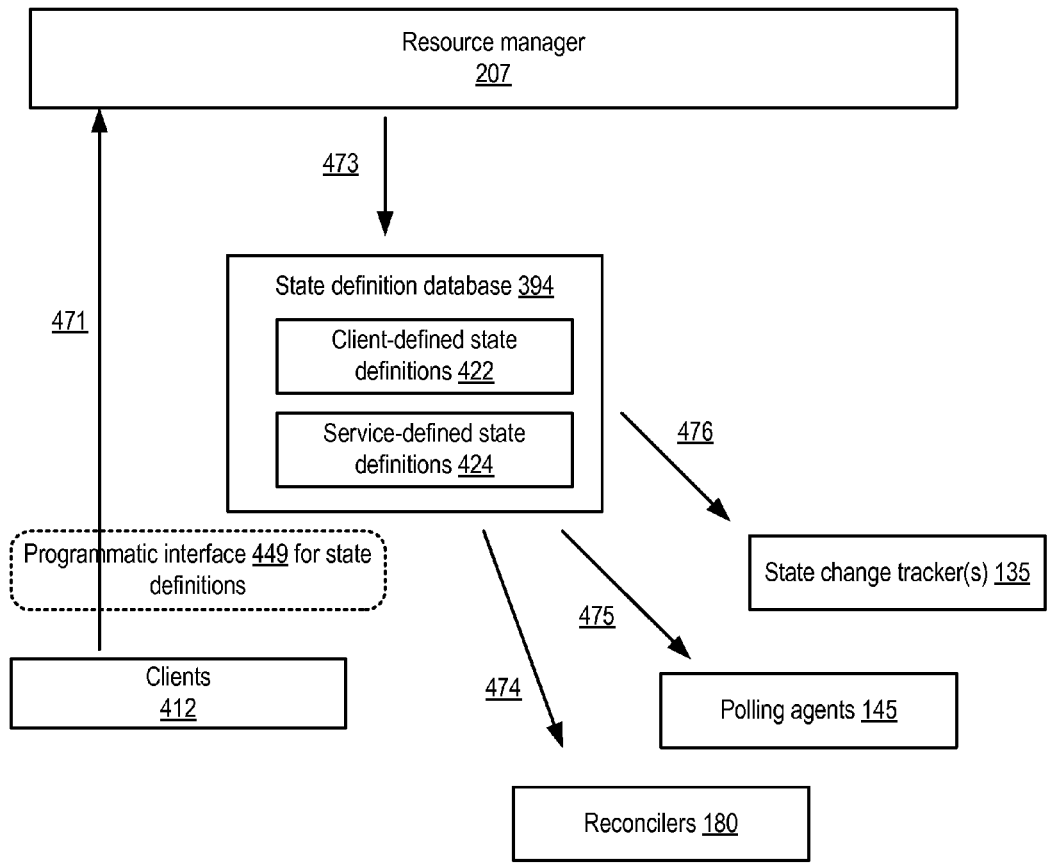
FIG. 4 illustrates a use of a programmatic interface to specify state definitions for resources, according to at least some embodiments.

FIG. 4 illustrates a use of a programmatic interface to specify state definitions for resources, according to at least some embodiments. In the depicted embodiment, clients 412 of various network-accessible services of the provider network may submit state definitions for a variety of resources, such as client applications executed at virtual compute instances assigned to the clients, via a programmatic interface 449 (such as a web page or an API) to a resource manager 207. A given state definition may, for example, define a plurality of states and specific indicators of transitions between the states that can be monitored or examined—for example, an occurrence of a message with a specified text string such as "application initialization complete" in an application's output log may indicate that the application has entered an active state from a starting state. In addition to applications, clients may be able to define states for virtual compute instances or other specific physical or logical resources as well in some embodiments. For example, a client interested in tracking resource utilization levels may define a state indicating that the CPU utilization at an instance is above 60%, or a state indicating that the number of active TCP (Transmission Control Protocol) connections from an instance exceeds a threshold. State definitions may also indicate formats for the expected state representations or detected state representations to be used, e.g., a state representation template in XML or JSON may be included in a given state definition.

The resource manager 207 may store client-defined state definitions 422 and/or service-defined state definitions 424 in state definition database 394, as indicated by arrow 473. The stored state definitions may be read from the database 394 by the state change trackers 135, polling agents 145, and/or reconcilers 180, as needed, as indicated by arrows 476, 475 and 474 respectively.

Methods for State Reconciliation

Figure 5:
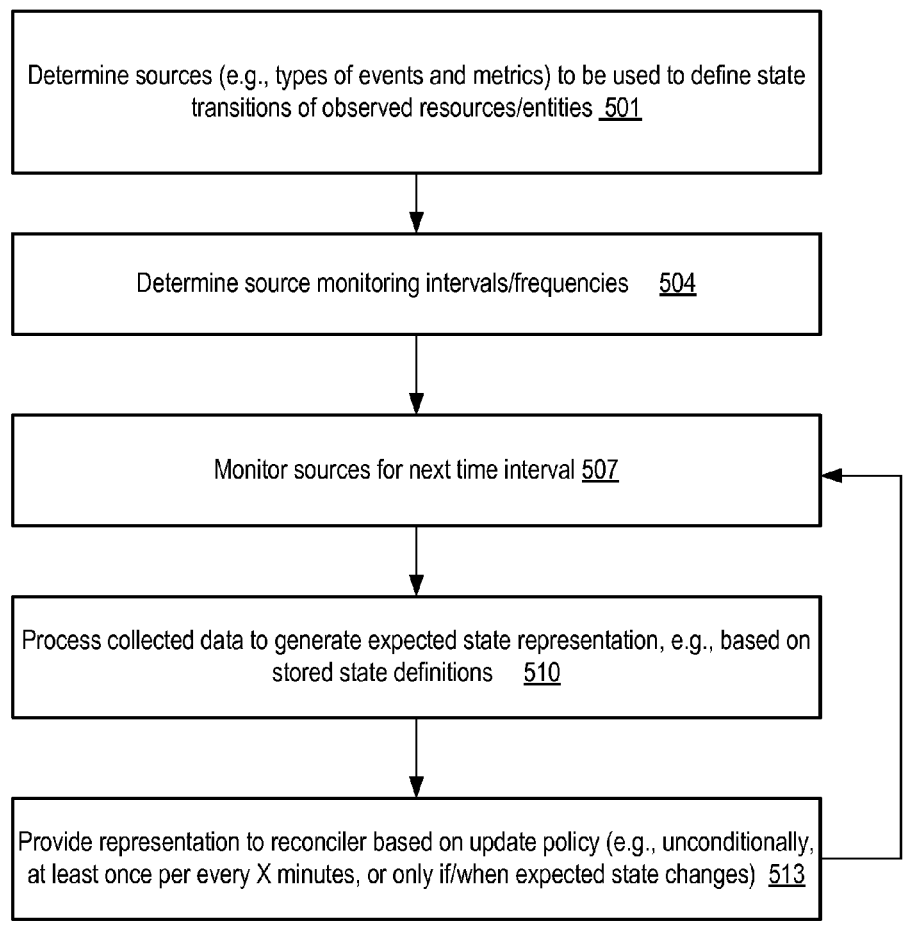
FIG. 5 is a flow diagram illustrating aspects of operations that may be performed at a state change tracker configured to interact with a state reconciler, according to at least some embodiments.

FIG. 5 is a flow diagram illustrating aspects of operations that may be performed at a state change tracker configured to interact with a state reconciler, according to at least some embodiments. As shown in element 501, a state change tracker 135 may determine the sources (e.g., the types of events and/or metrics) that are to be used to detect state transitions of a set of observed resources or entities. The sources may be indicated in a state definition database 394 in some embodiments. In some embodiments, the state change tracker may simply be configured to monitor each of a set of API calls and responses, and may not be required to read or analyze any state definitions per se. In some cases, only a subset of the API calls received may result in state changes of interest, and the state change tracker may only have to track the state-changing subset of the API calls.

As shown in element 504, depending on the types of events or metrics to be monitored, in some embodiments the state change tracker may have to determine the monitoring intervals or frequencies. For example, if state changes are defined in terms of average resource utilization metrics such as CPU utilization or disk utilization, the state change tracker may decide (e.g., based on state definition contents or configuration parameters) the time intervals for which the utilization metrics should be collected to compute the averages. In at least some embodiments, API call records may be collected for specified time intervals before being analyzed to determine expected states.

The metrics or events may be monitored for the next time interval (element 507) by the state change tracker. The collected data may be processed or analyzed to arrive at an expected state representation (element 510). The representation of the expected state may be provided to a reconciler (element 513). In at least some embodiments, an update policy may govern the format in which the expected state representation is to be provided, and/or how often the representations are to be provided. For example, an update policy may indicate that state representations (or the raw metrics on the basis of which expected states can be determined) are to be provided unconditionally to the reconciler, or that state representations are only to be provided if there has been a state change since the previous representation was sent, or that state representations are to be provided at least once every X minutes even if no changes occur in the interm.

Figure 6:
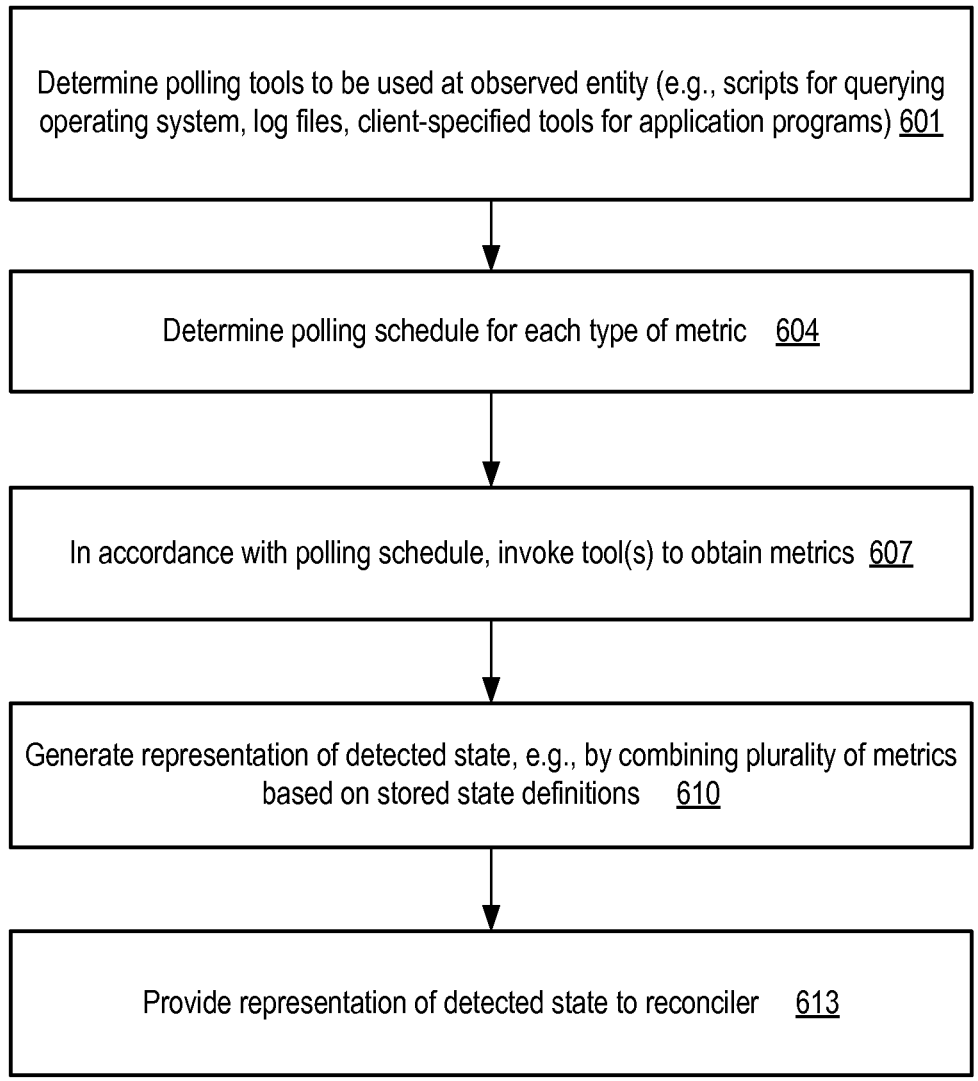
FIG. 6 is a flow diagram illustrating aspects of operations that may be performed at a polling agent configured to interact with a state reconciler, according to at least some embodiments.

FIG. 6 is a flow diagram illustrating aspects of operations that may be performed at a polling agent configured to interact with a state reconciler, according to at least some embodiments. As shown in element 601, a polling agent may determine a set of polling tools to be used to detect state information for a resource such as a virtualization host, a compute instance, or an application. A variety of tools may be available in different embodiments, including for example shell-script based tools or utilities that can be used to query an operating system or virtualization manager, performance tools, log files, or client-specified tools for detecting application states. In some embodiments, as illustrated in FIG. 2, polling agents may be instantiated either at hosts that are included among the monitored resources, or at external devices from which hosts and other resources can be polled remotely over network links. The respective polling schedules for various metrics may be determined (element 604), e.g., based on configuration settings of the polling agent. A given polling agent may be configured to collect different metrics at different rates, and in some implementations may also collect state metrics in response to requests from a reconciler.

In accordance with the polling schedule or schedules determined in operations corresponding to element 604, the polling agent may collect state information by invoking the polling tools (element 607). A representation of the detected state may be generated for each of several polled resources, e.g., based on metrics collected over some time period in accordance with the corresponding state definitions (element 610). The representation may then be provided to a reconciler (element 613). In some implementations the polling agent may transmit the data collected from the polling tools to the reconciler, and the reconciler may analyze the data to generate the representation of the state.

Figure 7:
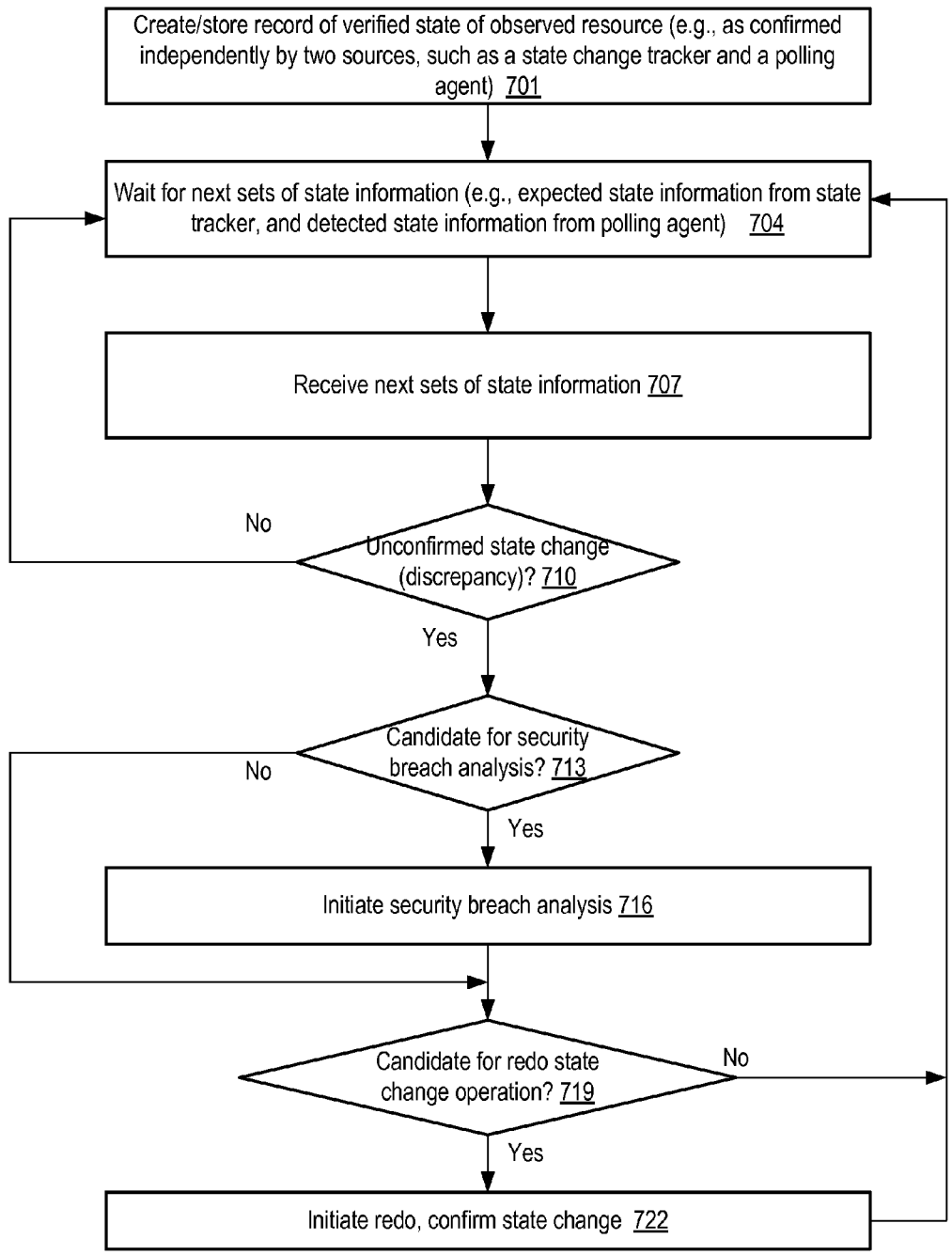
FIG. 7 is a flow diagram illustrating aspects of operations that may be performed at a state reconciler configured to interact with a state change tracker and a polling agent, according to at least some embodiments.

FIG. 7 is a flow diagram illustrating aspects of operations that may be performed at a state reconciler configured to interact with a state change tracker and a polling agent, according to at least some embodiments. As shown in element 701, for a given resource, the reconciler may create and/or store a record of a verified state, as confirmed by two independent sources such as a state change tracker and a polling agent. The reconciler may then wait for the next sets of state information from the two sources (element 704)— e.g., a new indication of an expected state from the state change tracker, and a new indication of a detected state from the polling agent.

The next sets of state information may be received at the reconciler (element 707). If a discrepancy is identified, i.e., if the expected state does not match the detected state (as determined in element 710), the reconciler may initiate one or more corrective actions responsive to the discrepancy. If the two sources of state information agree, i.e., the reconciler can confirm that the detected state matches the expected state, as also determined in element 710, the reconciler may update its records of confirmed states and resume waiting for the next state information updates (element 704).

Any of a variety of different actions may be initiated if a discrepancy is detected in different embodiments. For example, in some embodiments, the reconciler may make a determination as to whether the discrepancy could have been caused by a security breach, e.g., resulting from an unauthorized API call or some other operation from a malicious attack. If the reconciler makes such a determination (element 713), indicating that the discrepancy is a candidate for a security breach analysis, such an analysis may be initiated (element 716).

In some embodiments, and for some kinds of state discrepancies that may be detected, it may be possible that the discrepancy can be resolved by reissuing or repeating a state change operation. If the reconciler determines that the discrepancy is a candidate for such an operation (as detected in element 719), a command to repeat the state change (such as an API call) may be issued (element 722). In some embodiments, the reconciler may confirm that the discrepancy has been resolved, e.g., by sending requests to the polling agent and/or the state change tracker, or by waiting for the next sets of state change information from the polling agent and/or the state change tracker. The reconciler may then resume waiting for further state information messages.

It is noted that in various embodiments, operations other than those illustrated in the flow diagrams of FIGS. 5, 6 and 7 may be implemented to support state reconciliation techniques, and that some of the operations shown may not be implemented, or may be implemented in a different order or in parallel rather than sequentially.

Use Cases

The techniques described above, of utilizing reconcilers to confirm state changes and to resolve state discrepancies using alternative state discovery pathways, may be useful in a variety of environments. For example, in provider networks in which APIs are provided enabling clients to issue requests that can result in state changes at the virtualized resources allocated to the clients (or at hosts or servers on which the virtualized resources are instantiated), the operator of the provider network may wish to ensure that malicious entities have not managed to penetrate the security mechanisms in place for the APIs. Using an independent source of state information, such as a polling agent, to help verify that the actual state at a given resource matches the expected state, may allow the operator to identify and respond to anomalous or unexpected states rapidly, reducing the probability that clients are affected adversely.

Illustrative Computer System

Figure 8:
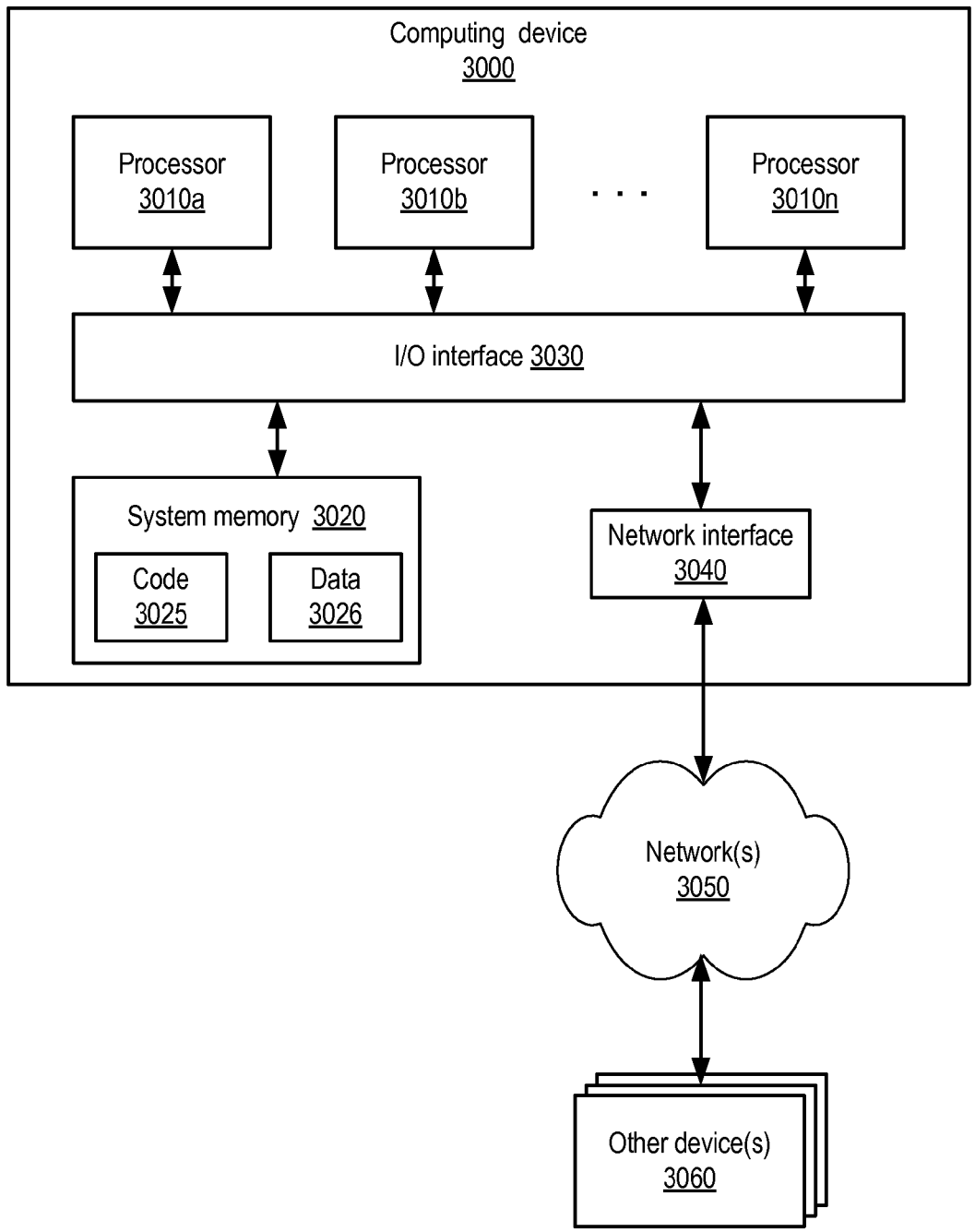
FIG. 8 is a block diagram illustrating an example computing device that may be used in at least some embodiments.

In at least some embodiments, a server that implements a portion or all of one or more of the technologies described herein, including the techniques to implement state change trackers, polling agents, resource managers, and reconcilers, may include a general-purpose computer system that includes or is configured to access one or more computer-accessible media. FIG. 8 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 7, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
monitor an occurrence of one or more events expected to result in a state change at a network-accessible resource of a provider network;
transmit, to a reconciler, an indication of an expected state of the network-accessible resource corresponding to the one or more events, the indication of the expected state based at least in part on the monitored occurrence of the one or more events;
transmit, from a polling agent to the reconciler, an indication of a detected state of the network-accessible resource, wherein the indication of the detected state of the network-accessible resource is determined independent of the monitoring;

determine, at the reconciler, whether a discrepancy exists between the expected state and the detected state; and in response to a determination that a discrepancy exists between the expected state and the detected state, initiate one or more actions responsive to the discrepancy, wherein the one or more actions comprise at least re-issuance of a state change command.

2. The system as recited in claim 1, wherein an event of the one or more events comprises an invocation of a programmatic interface implemented by a multi-tenant service of a provider network, and wherein the network-accessible resource comprises a virtualization host at which one or more virtualized resources of the multi-tenant service are instantiated.

3. The system as recited in claim 2, wherein the state change comprises one or more of: (a) a hardware state change at the virtualization host, (b) a software state change within a management software stack at the virtualization host, or (c) a software state change at a virtualized resource of the one or more virtualized resources.

4. The system as recited in claim 1, wherein the polling agent is instantiated at a computing device different from the network-accessible resource, wherein the polling agent is configured to detect a state of the observed entity using a software module installed at the observed entity.

5. The system of claim 1, wherein the one or more computing devices are further configured to, responsive to the re-issuance of the state change command:

send a request to the polling agent to transmit from the polling agent to the reconciler, an additional indication of the detected state of the network-accessible resource; and determine, at the reconciler, based at least in part on the additional indication of the detected state of the network-accessible resource, whether the discrepancy between the expected state and the detected state has been resolved.

6. The system of claim 5, wherein the one or more computing devices are further configured to, responsive to the re-issuance of the state change command:

send a request to a state change tracker to transmit to the reconciler, an additional indication of the expected state of the network-accessible resource corresponding to the one or more events; and determine at the reconciler, whether the discrepancy between the expected state and the detected state has been resolved further based at least in part on the additional indication of the expected state of the network-accessible resource.

7. A method, comprising:
performing, by one or more computing devices:

monitoring an occurrence of one or more events expected to result in a state change of an entity of a provider network;

transmitting, to a reconciler, an indication of an expected state of the entity, the indication based at least in part on the monitored occurrence of the one or more events;

determining, at the reconciler, whether a discrepancy exists between the expected state and a detected state, obtained independent of the monitoring using a polling mechanism, of the entity; and in response to determining that a discrepancy exists between the expected state and the detected state, initiating one or more actions responsive to the discrepancy, wherein the one or more actions comprise at least re-issuing a state change command.

8. The method as recited in claim 7, wherein an event of the one or more events comprises an invocation of a programmatic interface implemented by a multi-tenant service of a provider network, and wherein the entity comprises a virtualization host at which one or more virtualized resources of the multi-tenant service are instantiated.

9. The method as recited in claim 7, wherein said monitoring comprises analyzing contents of a log generated by an application programming interface (API) handler.

10. The method as recited in claim 9, wherein the log includes at least one of: (a) an entry indicating a submission of an API request to the entity and (b) an entry indicating a result of an API request submitted to the entity.

11. The method as recited in claim 7, wherein the state change comprises one or more of: (a) a hardware state change at a host, (b) a software state change within a management software stack at a virtualization host, or (c) a software state change at a virtualized resource of one or more virtualized resources at a virtualization host.

12. The method as recited in claim 7, wherein the entity comprises a device at which software modules can be installed, further comprising performing, by the one or more computing devices:

configuring a polling agent at a different device, wherein the polling agent is configured to detect a state of the entity via network interactions with a software module installed at the entity.

13. The method as recited in claim 12, wherein the software module installed at the entity comprises one or more of: (a) a shell script configured to query an operating system at the entity (b) a custom tool configured to interact with a client's application program at the entity.

14. The method as recited in claim 7, wherein the indication of the expected state comprises an ordered list of monitored events.

15. The method as recited in claim 7, further comprising performing, by the one or more computing devices:

implementing a programmatic interface enabling a state definition of the entity to be provided, wherein the state definition indicates at least one category of state changes to be monitored and at least one source of events expected to result in state changes; and storing a representation of a state definition received via the programmatic interface;

wherein said monitoring is based at least in part on an analysis of the state definition.

16. The method of claim 7, further comprising responsive to re-issuing the state change command:

sending a request to the polling agent to transmit from the polling agent to the reconciler, an additional indication of the detected state of the network-accessible resource; and determining, at the reconciler, based at least in part on the additional indication of the detected state of the network-accessible resource, whether the discrepancy between the expected state and the detected state has been resolved.

17. A non-transitory computer-accessible storage medium storing program instructions that when executed on one or more processors:

receive an indication of an expected state of a resource of a provider network, wherein said indication is based at least in part on a result of monitoring of one or more types of events by a state change tracker;

determine whether a discrepancy exists between the expected state and a detected state of the resource, wherein an indication of the detected state is obtained independent of the monitoring of the one or more types of events; and in response to a determination that a discrepancy exists between the expected state and the detected state, initiate one or more actions responsive to the discrepancy, wherein the one or more actions comprise at least re-issuing a state-changing event.

18. The non-transitory computer-accessible storage medium as recited in claim 16, wherein a type of event of the one or more types of events comprises an invocation of a programmatic interface implemented by a multi-tenant service of a provider network, and wherein the resource comprises a virtualization host at which one or more virtualized resources of the multi-tenant service are instantiated.

19. The non-transitory computer-accessible storage medium as recited in claim 17, wherein the expected state comprises a result of one or more of: (a) a hardware state change at a host, (b) a software state change within a management software stack at a virtualization host, or (c) a software state change at a virtualized resource of one or more virtualized resources at a virtualization host.

20. The non-transitory computer-accessible storage medium of claim 17, further storing program instructions that when executed on one or more processors, responsive to re-issuing the state-changing event:

send a request to the polling agent to transmit from the polling agent to the reconciler, an additional indication of the detected state of the network-accessible resource; and determine, at the reconciler, based at least in part on the additional indication of the detected state of the network-accessible resource, whether the discrepancy between the expected state and the detected state has been resolved.

* * * * *